United States Patent
Burton et al.

(10) Patent No.: US 10,488,195 B2
(45) Date of Patent: Nov. 26, 2019

(54) CURATED PHOTOGRAMMETRY

(71) Applicant: MICROSOFT TECHNOLOGY LICENSING, LLC, Redmond, WA (US)

(72) Inventors: Nick Burton, Redmond, WA (US); Vu Nguyen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 234 days.

(21) Appl. No.: 15/621,944

(22) Filed: Jun. 13, 2017

(65) Prior Publication Data
US 2018/0112978 A1    Apr. 26, 2018

Related U.S. Application Data

(60) Provisional application No. 62/412,762, filed on Oct. 25, 2016.

(51) Int. Cl.
*G06K 9/00* (2006.01)
*G01C 11/02* (2006.01)
(Continued)

(52) U.S. Cl.
CPC ............ *G01C 11/025* (2013.01); *G01C 11/04* (2013.01); *G06F 16/907* (2019.01);
(Continued)

(58) Field of Classification Search
CPC ....... G01C 11/025; G01C 11/04; G06T 7/579; G06F 16/907; G06K 9/224
See application file for complete search history.

(56) References Cited

U.S. PATENT DOCUMENTS 5,699,444 A    12/1997  Palm
7,463,280 B2   12/2008  Steuart, III
(Continued)

FOREIGN PATENT DOCUMENTS

WO    2012006578 A2    1/2012
WO    2014027229 A1    2/2014
(Continued)

OTHER PUBLICATIONS

"International Search Report and Written Opinion Issued in PCT Application No. PCT/US2017/057065", dated Apr. 10, 2018, 30 Pages.
(Continued)

*Primary Examiner* — Gregory M Desire
(74) *Attorney, Agent, or Firm* — Shook, Hardy and Bacon, L.L.P.

(57) ABSTRACT

Approaches to generating photogrammetry data are provided. In some implementations, a capture device captures a sequence of images of a physical environment while device poses of the capture device are tracked as the capture device moves around the physical environment. For each of image of images in the sequence of images, a corresponding device pose is stored as metadata of the image. Using photogrammetry, a three-dimensional (3D) model of the physical environment is generated from the images, where the photogrammetry uses for each image of the images, the corresponding device pose from the metadata of the image to generate the 3D model. In further respects, a user feedback loop can be used to direct a user to move the capture device to particular device poses for the capture of the images. Further camera properties used to capture an image may be stored in its metadata and used by the photogrammetry.

20 Claims, 9 Drawing Sheets

(51) Int. Cl.
    *G06F 16/907*    (2019.01)
    *G06K 9/22*    (2006.01)
    *G01C 11/04*    (2006.01)
    *G06T 7/579*    (2017.01)

(52) U.S. Cl.
    CPC ......... *G06K 9/00201* (2013.01); *G06K 9/224* (2013.01); *G06T 7/579* (2017.01); *G06K 2209/27* (2013.01); *G06K 2209/40* (2013.01)

(56) References Cited

U.S. PATENT DOCUMENTS

| | | | |
|---|---|---|---|
| 8,411,086 B2* | 4/2013 | Rieffel | G06T 17/00 345/419 |
| 8,542,911 B1 | 9/2013 | Korobkin | |
| 8,600,713 B2 | 12/2013 | Chen et al. | |
| 8,866,850 B1 | 10/2014 | Fan et al. | |
| 9,317,966 B1* | 4/2016 | Deephanphongs | G06T 17/00 |
| 9,324,190 B2* | 4/2016 | Bell | G06T 19/20 |
| 9,466,107 B2 | 10/2016 | Lin et al. | |
| 9,529,826 B2* | 12/2016 | Harp | G06F 16/5854 |
| 9,589,362 B2* | 3/2017 | Sarkis | G06T 19/00 |
| 10,257,505 B2* | 4/2019 | Scavezze | G06T 7/30 |
| 2013/0215221 A1 | 8/2013 | Wang et al. | |
| 2013/0286161 A1 | 10/2013 | Lv et al. | |
| 2014/0267406 A1* | 9/2014 | Mullins | G06T 19/006 345/633 |
| 2014/0270480 A1 | 9/2014 | Boardman et al. | |
| 2014/0327792 A1 | 11/2014 | Mulloni et al. | |
| 2015/0213590 A1* | 7/2015 | Brown | G06T 17/05 345/419 |
| 2015/0243072 A1 | 8/2015 | Haglund et al. | |
| 2016/0191893 A1* | 6/2016 | Gewickey | G11B 27/036 386/223 |
| 2018/0112978 A1* | 4/2018 | Burton | G06T 7/579 |
| 2019/0035165 A1* | 1/2019 | Gausebeck | G06T 19/20 |

FOREIGN PATENT DOCUMENTS

| | | |
|---|---|---|
| WO | 2015169338 A1 | 11/2015 |
| WO | 2015173173 A1 | 11/2015 |

OTHER PUBLICATIONS

"Invitation to Pay Additional Fee Issued in PCT Application No. PCT/US2017/057065", dated Jan. 30, 2018, 16 Pages.

Memon, et al., "A systematic procedure for developing the 3D model to evaluate the construction proiect progress", In Journal of Construction Innovation, vol. 7, Issue 2, Apr. 24, 2007, pp. 187-199.

Ouellet, et al., "Developing Assistant Tools for Geometric Camera Calibration: Assessing the Quality of Input Images", In Proceedings of the 17th International Conference on Pattern Recognition, vol. 4, Aug. 23, 2004, 4 pages.

Kirchhofer, et al., "Cultural Heritage Recording Utilising Low-Cost Closerange Photogrammetry Images", In Journal of Geoinformatics FCE CTU, vol. 6, Dec. 2011, 8 pages.

* cited by examiner

CURATED PHOTOGRAMMETRY

CROSS-REFERENCE TO RELATED APPLICATIONS

This application claims the benefit of U.S. Provisional Application No. 62/412,762, titled "Curated Photogrammetry," filed Oct. 25, 2016, which is hereby expressly incorporated by reference in its entirety.

BACKGROUND

Three-Dimensional (3D) capture technologies allow real-world objects and environments to be reproduced as corresponding 3D virtual objects. The 3D virtual objects have many possible uses such as for 3D printing, augmented reality (AR) and virtual reality (VR) experiences, rapid prototyping, movies, and more. Typically, a 3D virtual object may be generated by capturing the environment with one or more capture devices, which include any number of environmental sensors capable of detecting physical features of the real-world. These physical features are translated into corresponding features of the 3D virtual object.

Applications that use photogrammetry for 3D capture may acquire a series or set of images or video of the environment using a camera. This photogrammetry data is naively processed by a system with no knowledge of the quality or suitability of the data for producing 3D models. Typically, the photogrammetry data is captured arbitrarily, such as where a user presses a capture button of a camera each time an image should be captured, controls movement or positions the camera for capture, or sets up multiple cameras to capture data simultaneously. Due to the arbitrary nature of this process, 3D models produced from photogrammetry tend to include holes, gaps, or artifacts that lower the quality of the models. This can be due to, for example, the photogrammetry data being incomplete, the data being captured under unsuitable conditions for the photogrammetry, or the photogrammetry may be unable to accurately characterize the photogrammetry data to determine capture conditions for producing the model. Further, the photogrammetry data may include redundant information, which increases processing requirements and can lead to inconsistent results.

SUMMARY

In some respects, the present disclosure provides systems and methods of acquiring photogrammetry data. In some implementations, a system tracks a capture device as a user moves the capture device around an object or space while the capture device is providing a video feed of capture data from which snapshots, or images, or photogrammetry data are provided. Poses of the capture device are stored and monitored to ensure the "capture track" of the images meets the desired path for the chosen scenario (e.g., object(s) vs. space capture). The system captures images at intervals while ensuring the correct image-to-image coverage and angular separation between the images are achieved. Where the system determines more photogrammetry data should be provided, the system provides user feedback to guide the user to the correct device pose to allow the additional data to be obtained. At each capture position the video feed is processed to ensure the image content is suitable and camera parameters are adjusted to optimize the photogrammetry data captured at that position.

In further respects, each capture position(s) is associated with a corresponding device pose, captured image or images, and image characteristics (e.g., camera intrinsic parameters). This information is used for post processing as photogrammetry source material to yield a 3D textured reconstruction of the original scene or object. In some cases, the capture device provides (e.g., uploads) this photogrammetry data to a server (e.g., the cloud) or another local device for the post processing. This can occur after the system determines a sufficient set of photogrammetry data has been captured for reproduction, or while the photogrammetry data is being captured.

Aspects of the present disclosure provide pose priors calculated in real time, which are stored with each corresponding image as a device pose. This provides the photogrammetry with precise and accurate poses for particular photos, significantly improving quality and reliability of the photogrammetry in reproducing real world objects and spaces. Processing times are reduced as the system monitors whether sufficient photogrammetry data has been obtained so that the amount of data can be tuned to photogrammetry requirements without the capture of redundant data.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this disclosure. Rather, the inventors have contemplated that the subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure streamline the process of 3D capture (of a scene or object(s)) using photogrammetry and provide multiple resolution check points throughout. Immediate feedback may be provided to the user via local client capture algorithms that analyze capture data. At the same time, capture data may be streamed to a cloud based service for more extensive analysis to improve object resolution.

Using approaches described herein, a smaller data set than would otherwise be achievable that is well suited to reconstruction may be obtained. This data can be tuned to what the photogrammetry backend requires. In contrast, conventional approaches to photogrammetry may take hours of processing and result in a low quality reproduction.

Figure 1:
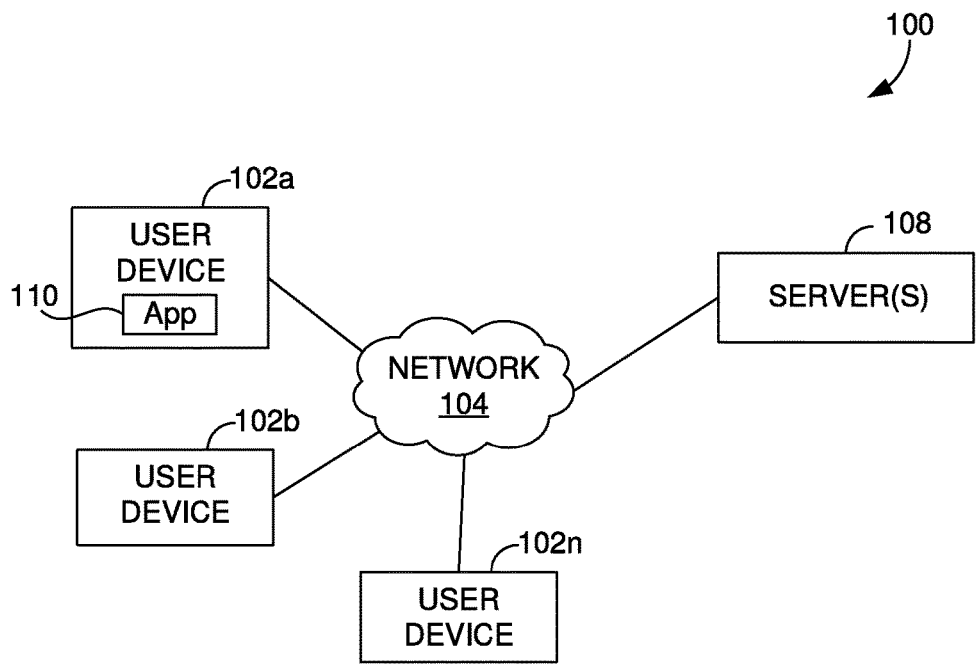
FIG. 1 is a block diagram showing an example of an operating environment, in accordance with embodiments of the present disclosure.

Turning now to FIG. 1, a block diagram is provided showing an example of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes a number of user devices, such as user devices 102a and 102b through 102n, network 104, and server(s) 108.

It should be understood that operating environment 100 shown in FIG. 1 is an example of one suitable operating environment. Each of the components shown in FIG. 1 may be implemented via any type of computing device, such as one or more of computing device 900 described in connection to FIG. 9, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other disclosed components may be employed within operating environment 100 within the scope of the present disclosure. Each may comprise a single device or multiple devices cooperating in a distributed environment.

User devices 102a through 102n comprise any type of computing device capable of being operated by a user. For example, in some implementations, user devices 102a through 102n are the type of computing device described in relation to FIG. 9 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, a 3D scanning device, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out 3D capture. In some implementations, the application(s) comprises a web application, which can run in a web browser, and could be hosted at least partially on the server-side of environment 100. In addition, or instead, the application(s) can comprise a dedicated application, such as an application having at least some image processing functionality. In some cases, the application is integrated into the operating system (e.g., as one or more services). It is therefore contemplated herein that "application" be interpreted broadly.

Server(s) 108 also includes one or more processors, and one or more computer-readable media. The computer-readable media includes computer-readable instructions executable by the one or more processors.

Any combination of the instructions of server (108) and/or user devices 102a through 102n may be utilized to implement one or more components of photogrammetry system 206 of FIG. 2, which is described in additional detail below.

Figure 2:
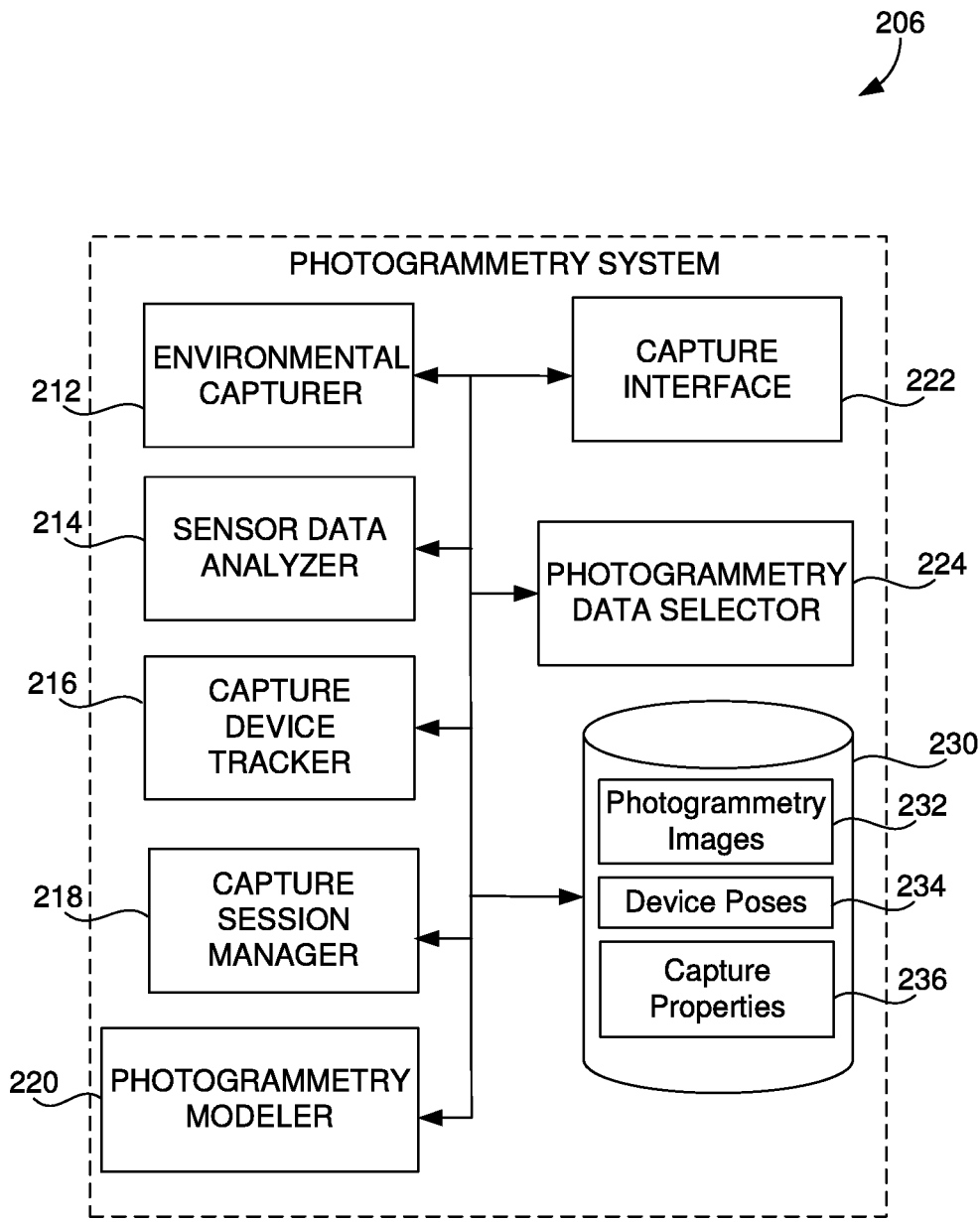
FIG. 2 shows a block diagram of a photogrammetry system, in accordance with embodiments of the present disclosure.

Referring to FIG. 2, a block diagram of a photogrammetry system is shown, in accordance with embodiments of the present disclosure. Photogrammetry system 206 includes environmental capturer 212, sensor data analyzer 214, capture device tracker 216, capture session manager 218, photogrammetry modeler 220, capture interface 222, photogrammetry data selector 224, and storage 230.

As indicated above, the foregoing components of photogrammetry system 206 can be implemented, for example, in operating environment 100 of FIG. 1. In particular, those components may be integrated into any suitable combination of user devices 102a and 102b through 102n, and server(s) 108. For cloud-based implementations, the instructions on server 108 may implement one or more components or portions thereof of photogrammetry system 206, and application 110 may be utilized by a user to interface with the functionality implemented on server(s) 108. In some cases, server 108 may not be required. For example, the components of photogrammetry system 206 may be implemented completely on a user device, such as user device 102a. In these cases, photogrammetry system 206 may be embodied at least partially by the instructions corresponding to application 110.

Thus, it should be appreciated that photogrammetry system 206 may be provided via multiple devices arranged in a distributed environment that collectively provide the functionality described herein. Additionally, other components not shown may be included within the distributed environment. In addition, or instead, photogrammetry system 206 can be integrated, at least partially, into a user device, such as user device 102*a*. Furthermore, photogrammetry system 206 may at least partially be embodied as a cloud computing service.

Storage 230 can comprise computer-readable media and is configured to store computer instructions (e.g., software program instructions, routines, or services), data, and/or models used in embodiments described herein. In some implementations, storage 230 stores information or data received via the various components of photogrammetry system 206 and provides the various components with access to that information or data, as needed. In implementations, storage 230 comprises a data store (or computer data memory). Although depicted as a single component, storage 230 may be embodied as one or more data stores and may be at least partially in the cloud. Further, the information in storage 230 may be distributed in any suitable manner across one or more data stores for storage (which may be hosted externally).

In the implementation shown, storage 230 includes at least photogrammetry images 232, device poses, 234, and capture properties 236, which are described in further detail below.

As an overview, capture session manager 218 manages the various components of photogrammetry system 206 to implement capture sessions for real world objects or spaces. Capture interface 222 provides a user interface to environmental capturer 212, which is operable to collect sensor data from one or more sensors via one or more capture devices, such as one or more of user devices 102*a* through 102*n* in FIG. 1. Sensor data analyzer 214 analyzes the sensor data, which can include images, video, device pose readings, and the like, and forms associations between the various sensor data resulting in capture data. Capture device tracker 216 tracks device poses and/or positions of the capture device. Photogrammetry data selector 224 is configured to select one or more portions of the capture data for photogrammetry performed by photogrammetry modeler 220.

As mentioned above, capture session manager 218 manages the various components of photogrammetry system 206 to implement capture sessions for real world objects or spaces. In some implementations, a capture session includes environmental capturer 212 collecting sensor data, capture data analyzer 214 forming capture data from the sensor data, and photogrammetry data selector 224 selecting photogrammetry data for photogrammetry modeler 220. A capture session may conclude, for example, where capture session manager 218 determines photogrammetry data selector 224 has selected sufficient photogrammetry data for photogrammetry modeler 220 to reconstruct one or more real world objects or spaces.

In some cases, via capture interface 222, a user selects or otherwise indicates one or more subjects for capture (e.g., by selecting a visual representation of one or more objects, areas, spaces, or regions of the environment), such as from a video feed and/or image of the real world environment. Capture session manager 218 can use this information to determine when sufficient photogrammetry data has been captured. In addition, or instead, a user may selectively commence a photogrammetry session via capture interface 222, and an initial device pose, and/or image analysis may be employed to determine any combination of the aforementioned information.

Figure 3:
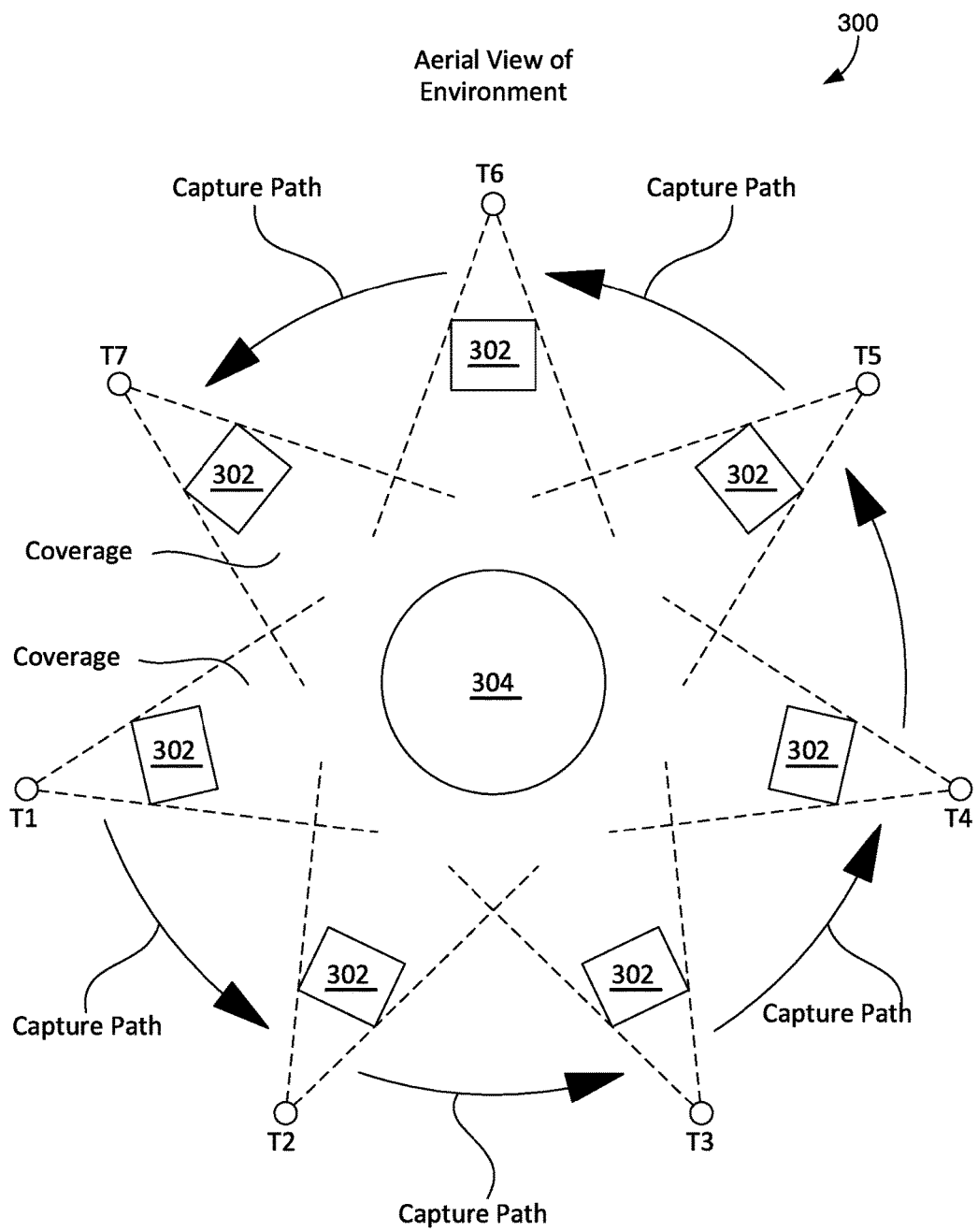
FIG. 3 shows an illustration of a capture session, in accordance with embodiments of the present disclosure.

FIG. 3 illustrates an example of a capture session in accordance with implementations of the present disclosure.

In FIG. 3 illustrates capture session 300, which may be implemented using photogrammetry system 206 of FIG. 2. Capture session 300 is directed toward capturing photogrammetry data in order to produce a 3D model corresponding to object 304.

FIG. 3 shows capture session 300 with different device poses of capture device 302 at different times T1, T2, T3, T4, T5, T6, and T7, which is listed in chronological order. Capture session manager 218 can direct a user to manipulate capture device 302 into the various device poses shown. This may include capture session manager 218 using capture interface 222 to provide visual and/or audible indicators to the user in order to direct the user to the proper position in space, as well as to direct the user as to the orientation of capture device 302. As an example, a display of capture device 302 may include an arrow pointing toward the position and/or angle for the device in space. In addition, or instead, an audible indicator or haptic feedback may intensify as the capture device approaches the correct position and/or orientation and fade for as the device goes further from the desired pose.

To this effect, capture session manager 218 may utilize capture device tracker 216 in order to track and monitor the device pose of capture session manager 218 in real-time. Capture device tracker 216 may compute in real-time the camera trajectory and a sparse 3D reconstruction of a scene. In some implementations, capture device tracker 216 uses optical based tracking and/or inertial measurement unit (IMU) based device tracking along with image processing to track the position of the capture device. The tracking can comprise, for example, six degrees of freedom (6DoF) device tracking. This can be implemented, for example, using simultaneous Localization and Mapping (SLAM). SLAM generally includes constructing and/or updating a map of an unknown environment while simultaneously keeping track of an agent's (e.g., the capture device's) location within the environment. One suitable approach uses ORB-SLAM with a monocular, stereo, and/or RGB-D camera of the capture device.

A device pose can include an orientation of the capture device in space. The orientation can be determined with respect to the environment, itself, the subject of capture like object 304, and/or other device poses. Capture session manager 218 may determine or compute a device pose for capture based on previous photogrammetry data, such as that selected by photogrammetry data selector 224, previous capture data, and/or SLAM data. A device pose may correspond to, for example, a distance from a subject of capture, one or more angles of the device along one or more axes with respect to the subject, and/or a height of the device.

Capture session manager 218 can determine whether capture device 302 has achieved a particular device pose. This may including determine the various parameters of the device pose are within one or more threshold values or ranges, such as distance thresholds and/or angular thresholds. In some cases, based on determining, capture session manager 218 may activate environmental capturer 212 to acquire capture data, such as an image, snapshot, or video. In other cases, the capture data may be obtained continuously throughout capture session 300. Photogrammetry data selector 224 may select photogrammetry data from the capture data, which corresponds to the device pose (e.g., while in the device pose or later). Photogrammetry data selector 224 can associate capture data (e.g., one or more phones or video of the environment) with one or more corresponding time stamps, ranges, and/or device poses. In various implementations, photogrammetry data selected for a given device pose includes at least one or photogrammetry images 232, each stored in association with one of device poses 234, as well as one or more of capture properties 236.

Capture properties 236 are descriptive of capture conditions of photogrammetry data. A particular photogrammetry image and/or video may be associated with a set of capture properties. Capture properties can include, for example, one or more time stamps, optics descriptors or identifiers of a camera lens or lenses used during capture.

In some implementations, based on capture session manager 218 determining the capture device has achieved or is in a designated device pose, capture session manager 218 automatically adjusts camera properties for the capture of photogrammetry data. This can be done to improve the quality of the photogrammetry data. Parameters which may be adjusted and/or analyzed by capture session manager 218 include, for example, exposure, histogram, contrast, sharpness, focus, motion blur, feature points, feature density, and/or noise (ISO induced or otherwise). The capture parameters can be determined based on the photogrammetry performed by photogrammetry modeler 220 in order to achieve photogrammetry data likely to produce high quality 3D models.

Typically, photogrammetry algorithms may infer capture parameters and device poses from only the visual data (e.g., images or video) captured by a camera. This is a common source of error in photogrammetry, which causes inaccurate 3D models to be produced by the photogrammetry. By providing the capture parameters and device poses, a photogrammetry algorithm need not infer these properties (e.g., camera properties) and device pose, resulting in better outcomes.

Suitable photogrammetry algorithms include stereophotogrammetry algorithms. A stereophotogrammetry algorithm may estimate three-dimensional coordinates of points on an object employing measurements made in two or more photographic images taken from different positions. Common points can be identified on each image. Using such capture parameters and device poses (which can include location and height), associated with each portion of capture data (e.g., each image), the photogrammetry algorithm can precisely determine these common points, by comparing and analyzing the information between these portions. Further, a line of sight (or ray) can be constructed from the camera location to the point on the object. Using such capture parameters and device poses, associated with a portion of capture data, this line of sight can be precisely determined for that portion. As the intersection of these rays (triangulation) may determine the three-dimensional location of a point, precisely determining these ray can drastically enhance photogrammetry outcomes.

Some suitable algorithms for photogrammetry which may be adapted to the present disclosure include those used in Agisoft PhotoScan and Capturing Reality.

In addition or instead, capture session manager 218 may grade or score photogrammetry data corresponding to the device pose with respect to one or more of any combination of these parameters. Scoring or grading can be based on an analysis and determination of the number of features in the scene, exposure, histogram, sharpness, and many more using image analysis. Where one or more capture scores fail to satisfy one or more threshold values, capture session manager 218 may, based on this determination(s), calculate adjustment values, such as by comparing the scores to reference scores or values. Capture session manager 218 may further automatically update environmental capturer 212 to implement the corresponding updated capture properties. This process may continue until capture session manager 218 determines the captured data for the device pose is sufficient for photogrammetry (e.g., satisfies the thresholds), until a threshold amount of time passes, until the device pose falls outside of the pose thresholds, or otherwise determines some ending condition is satisfied.

Capture session manager 218 may further determine (e.g., based on one or more ending conditions being satisfied) whether to obtain additional photogrammetry data. For example, capture session manager 218 may select another device pose from which to achieve photogrammetry data from. This device pose could correspond to capture device 302 at time T2 in FIG. 3. The aforementioned process may be repeated for each device pose capture session manager 218 determines for the capture of photogrammetry data.

In some cases, capture session manager 218 determines one or more of the device poses in advance of the capture of photogrammetry data. For example, capture session manager 218 could determine a set of device poses for a subject to be captured in the environment, then deign directing the user to those poses and/or indicating those poses to the user. As another example, capture session manager 218 could determine a device pose based on a previous device pose and/or photogrammetry data captured at a previous device pose. In some implementations, capture session manager 218 determines a capture path or track, which may include a sequence of device poses in temporal order. Regardless of the approach, capture session manager 218 may determine or select a nearest device pose to the previous device pose in order to reduce capture time. For example, where a live video feed and/or real-time user directions are employed, power consumption can be significantly reduced.

It should be appreciated that any of these various determinations may be updated during a capture session, such as based on capture session manager 218 identifying or detecting one or more deficiencies in the currently captured photogrammetry data and/or a change in the environment or subject in the environment. As an example, if lighting conditions in an environment change, capture session manager 218 may determine better photogrammetry data could be captured and direct the user to a device pose to replace, add to, or supplement photogrammetry data.

Capture session manager 218 may make determinations of device poses, such as capture plans or tracks based at least in part on determining coverage of the photogrammetry data. In some cases, capture session manager 218 determines device poses to achieve photogrammetry images captured that are at most approximately 15 degrees in separation (or some other angle of separation). This angle of separation can represent a preferred rotational distance between images in an input stream of the photogrammetry algorithm. Further, capture session manager 218 can determine device poses such that photogrammetry images captured include at least 20% coverage frame-to-frame (or some other coverage). Photogrammetry data selector 224 can select a set of photogrammetry data from the capture data which satisfies these various variables and factors. This can, for example, reduce the quantity of photogrammetry data photogrammetry modeler 220 processes. Times T1, T2, T3, T4, T5, T6, and T7 in capture session 300 may each correspond to a respective photogrammetry image, which collectively represents a minimum set of photogrammetry images that satisfies these conditions. Where capture session manager 218 determines photogrammetry system 206 is unable to capture sufficient photogrammetry data from one or more of these devices poses, one or more intervening device poses could be determined and the user may be directed to these poses.

In some cases, capture session manager 218 determines to end a capture session based on determining a sufficient set of photogrammetry data has been captured. Based on such a determination, in some cases, photogrammetry modeler 220 provides one or more 3D models generated by photogrammetry modeler 220 from the photogrammetry data. Capture interface 222 may optionally display the 3D modeled, or a visual representation or indicator of the 3D model. In some implementations, the user can inspect the 3D model(s) via capture interface 222 or another interface on a user device, which may include rotating the model, zooming in and out of a view of the mode, and/or panning a view of the model. In some cases, photogrammetry system, 206 may save the model(s) persistently for later use (e.g., display, 3D printing, etc.), such as in a known 3D format and the user may provide a file or model name, or the like. It should be appreciated that 3D models captured using this approach have many potential applications, which is not intended to be limited by the present disclosure.

In some implementations, photogrammetry modeler 220 is located in the cloud, such as on server 108, or in another device (e.g., a desktop computer). Photogrammetry data selector 224 may be located on a user device, such as a capture device. As photogrammetry data is selected, it may be streamed to photogrammetry modeler 220 for processing (e.g., from the user device), or the photogrammetry data may not be provided until a complete set is selected. This can reduce processing power and time required by the capture device and further free up these resources for evaluating the suitability of capture data for the photogrammetry. In some cases, these evaluations are performed using heuristics which have low processing requirements and are tailored to photogrammetry modeler 220 to increase the likelihood that photogrammetry modeler 220 produces an accurate representation of the environment (e.g., a textured scene). In some cases, low resolution object reconstruction could be performed on the capture device. Using the device poses and device parameters along with the corresponding photogrammetry images, photogrammetry modeler 220 can accurately interpret those images in the photogrammetry (e.g., for high resolution object reconstruction).

It should be appreciated that in some cases, multiple capture devices could be employed. Further, capture session manager 218 could direct the user in positioning each of these various capture devices in order to obtain the photogrammetry data for a capture session. As an example, each device pose shown in FIG. 3 could be of a separate capture device (e.g., a camera). Capture session manager 218 could direct the user in placement of each capture device similar to as described above. Further, in some cases, photogrammetry data may not be captured until each capture device is configured in its corresponding pose. Capture session manager 218 could control the capture of photogrammetry data for each of those devices, including adjusting capture properties as described above. In some cases, the capture plan is based on these various capture devices, and capture session manager 218 could determine the capture plan based on the number of devices and/or device properties including lens type, optics variables of the camera, etc.

Further, in some cases, the present disclosure provides for the automatic adjustment of camera or capture properties used to capture a photogrammetry image, as described above, as well as storage of those properties and/or the corresponding device pose in association with the image. This may be accomplished without necessarily directing the user in a capture session. By providing this rich capture information to photogrammetry modeler 220, the quality of 3D models can be sufficiently improved.

FIGS. 4, 5, 6, 7, and 8 illustrate examples of flow diagrams in accordance with aspects of the present disclosure, any combination of which may corresponds to at least some of capture session 300. For example, FIG. 5 may correspond to a capture session, such as capture session 300.

Figure 4:
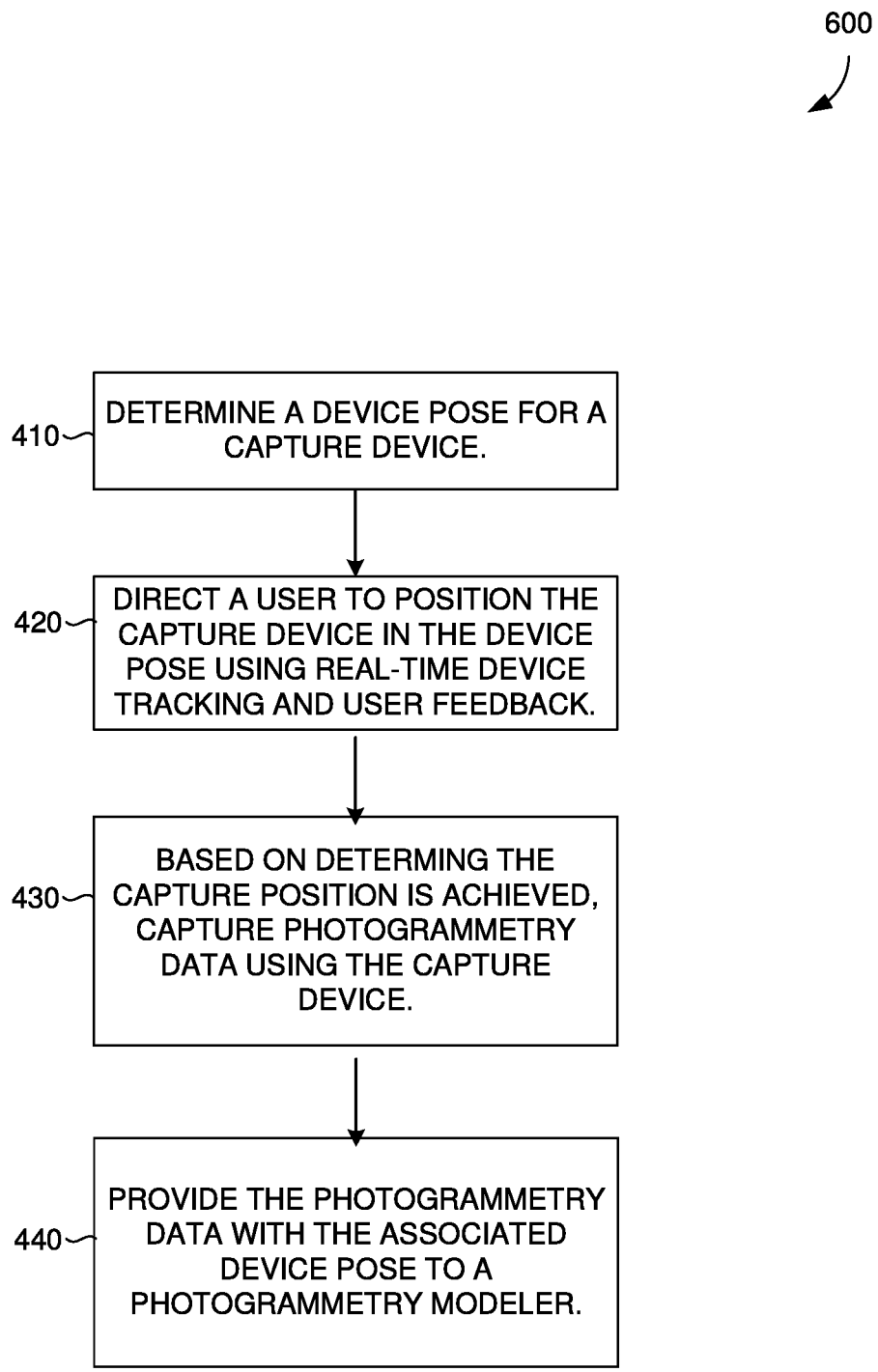
FIG. 4 is a flow diagram showing a method in accordance with embodiments of the present disclosure.

Referring to FIG. 4, FIG. 4 is a flow diagram showing method 400 for generating photogrammetry data. Each block of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 410, method 400 includes determining a device pose for a capture device. For example, capture session manager 218 may determine a device pose for a capture device. At block 420, method 400 includes directing a user to position the capture device in the device pose using real-time device tracking and user feedback. For example, a user feedback loop may be employed. A user feedback loop refers to a cyclical process in which user input is received, device feedback is presented (e.g., haptic and/or visual feedback) based on the user input, and the forgoing repeats until one or more ending conditions are satisfied (e.g., the device determines is has achieved the desired position). For example, capture session manager 218 may direct a user to position the capture device in the device pose using capture device tracker 216. At block 430, method 400 includes based on determining the capture position is achieved, capturing photogrammetry data using the capture device. For example, capture session manager 218 may determine the capture position is achieved and photogrammetry data selector 224 may select photogrammetry data for photogrammetry based on the determination. At block 440, method 400 includes providing the photogrammetry data with the associated device pose to a photogrammetry modeler. For example, photogrammetry data selector 224 may provide the photogrammetry data to photogrammetry modeler 220.

Figure 5:
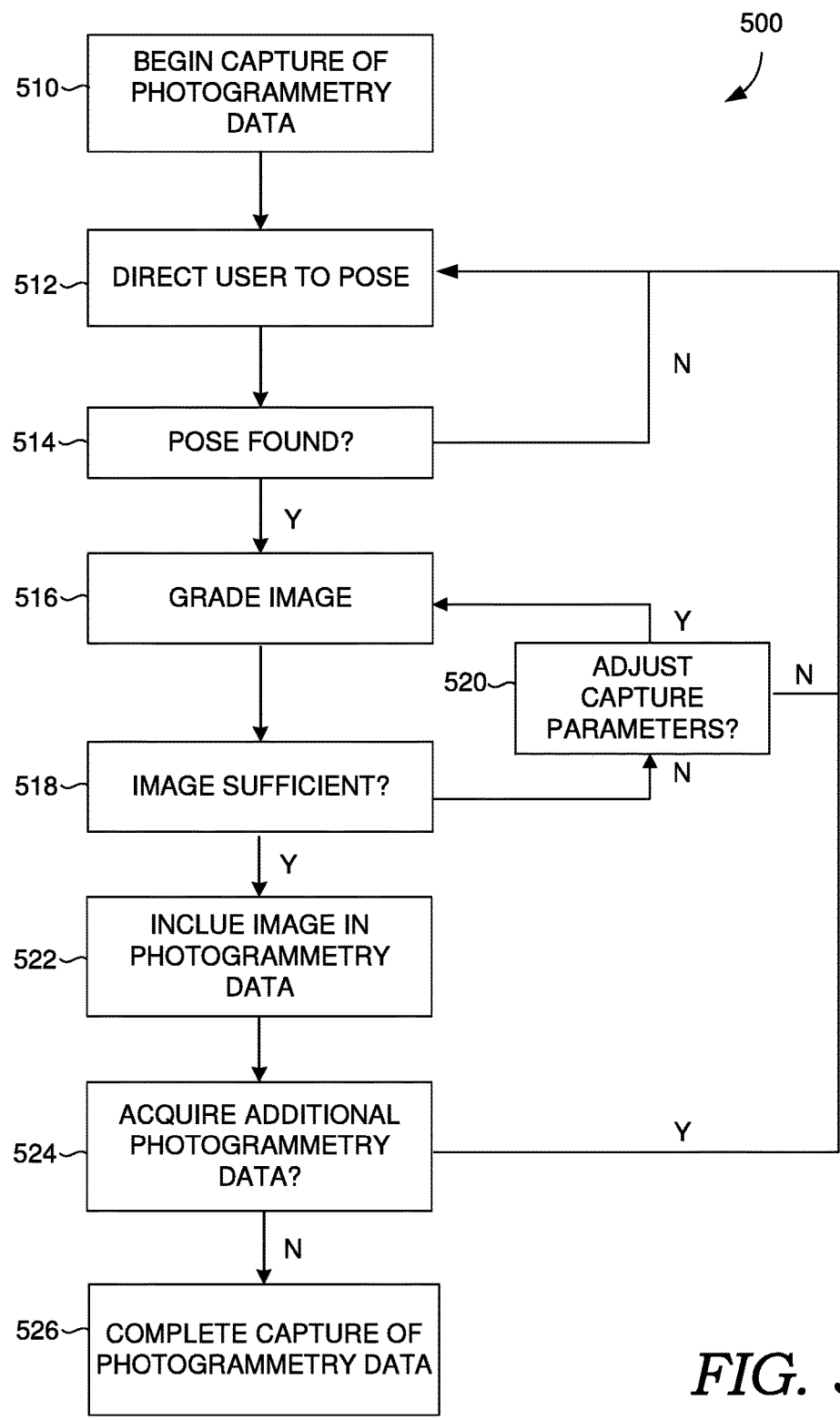
FIG. 5 is a flow diagram showing a method in accordance with embodiments of the present disclosure.

Referring to FIG. 5, FIG. 5 is a flow diagram showing method 500 for generating photogrammetry data. At block 500, method 500 includes beginning capture of photogrammetry data. At block 512, method 500 includes directing a user to move a capture device to a device pose. At block 514 it is determined whether the capture device has achieved the device pose. If it is determined the capture device has not achieved the device pose, the user may be further directed to move the capture device to the device pose and the determination may repeat. If it is determined the capture device has achieved the device pose, at block 514, an image corresponding to the device pose is scored or graded. At block 518, it is determined whether the image is sufficient for photogrammetry based on the score or grade. If it is determined the image is not sufficient for photogrammetry, at block 520, capture properties of the capture device may be updated. An additional image may be captured using the adjusted capture properties if the capture device corresponds to the device pose and method 500 may proceed to grade the additional image at block 516. If it is determined the capture device no longer corresponds to the device pose, method 500 may proceed to block 512 to direct the user to move the capture device to the device pose.

If at block 518, it is determined the image is sufficient for photogrammetry based on the score or grade, method 500 may proceed to block 522. At block 522, the image is included in photogrammetry data. At block 524, it is determined whether to acquire additional photogrammetry data. If it is determined to acquire additional photogrammetry data, method 500 may proceed to block 512 using a different device pose. If it is determined to no longer acquire additional photogrammetry data, method 500 may proceed to block 526. At block 526, the capture of the photogrammetry data is completed. The photogrammetry data can be used by photogrammetry to generate a 3D model of the environment.

Figure 6:
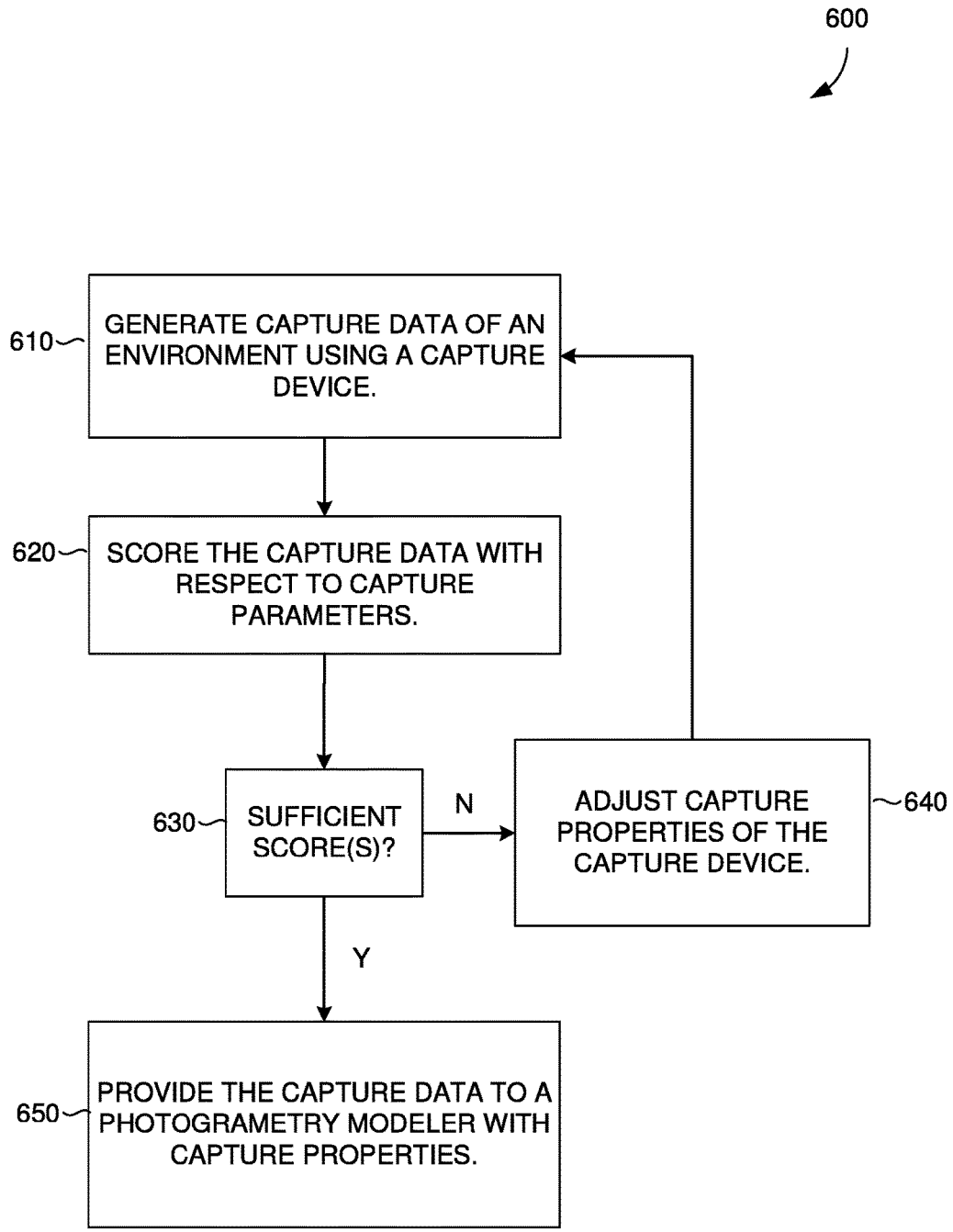
FIG. 6 is a flow diagram showing a method in accordance with embodiments of the present disclosure.

Referring to FIG. 6, FIG. 6 is a flow diagram showing method 600 for generating photogrammetry data. At block 610, method 600 includes generating capture data of an environment using a capture device. At block 620, method 600 includes scoring the capture data with respect to capture parameters. At block 630, method 600 includes determining whether the score(s) are sufficient for photogrammetry. Where it is determined the score(s) are not sufficient, method 600 may proceed to block 640, which includes adjusting camera properties of the capture device. Blocks 610, 620, and 630 may be repeated until suitable capture data is obtained for a device pose. Where it is determined the score(s) are sufficient, method 600 may proceed to block 650, where the capture data is provided to a photogrammetry modeler with capture properties corresponding to the capture data. The capture data and capture properties can be used by photogrammetry to generate a 3D model of the environment.

Figure 7:
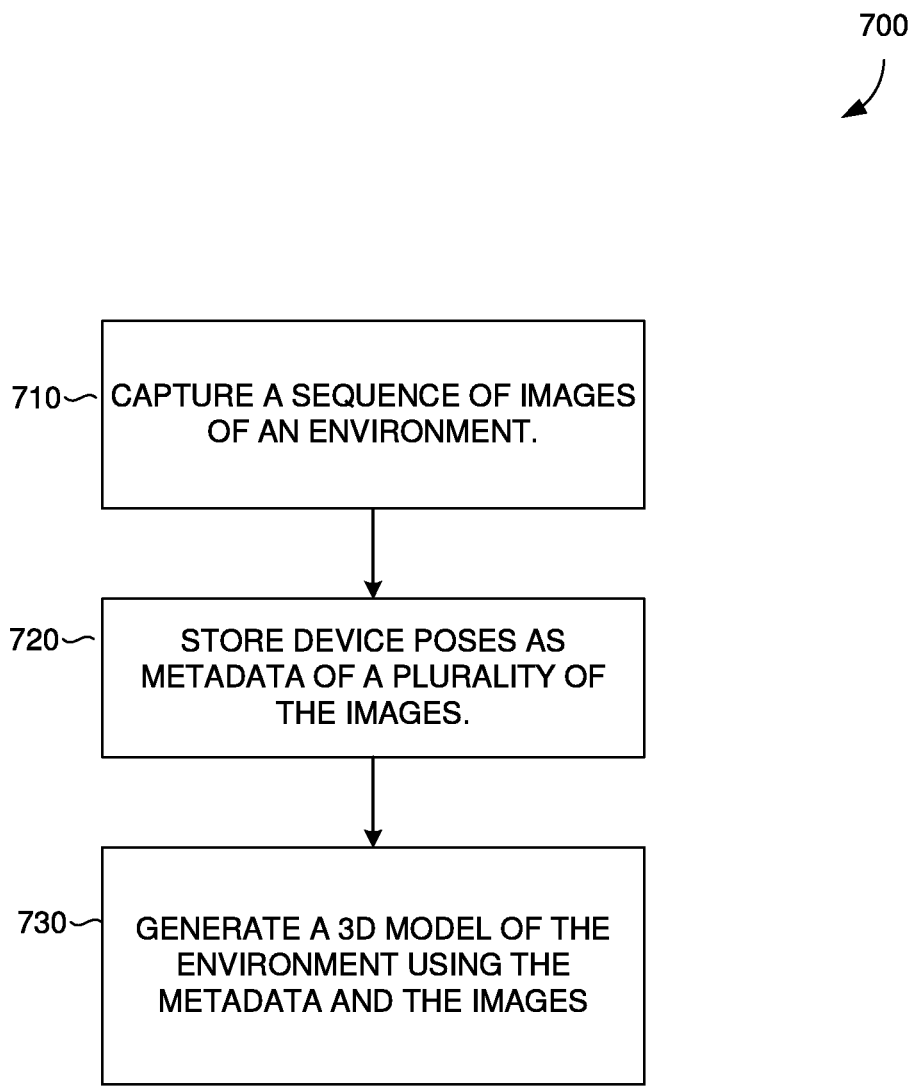
FIG. 7 is a flow diagram showing a method in accordance with embodiments of the present disclosure.

Referring to FIG. 7, FIG. 7 is a flow diagram showing method 700 for generating photogrammetry data. At block 710, method 700 includes capturing a sequence of images of an environment. At block 720, method 700 includes storing device poses as metadata of a plurality of the images. At block 730, method 700 includes generating a 3D model of the environment using the metadata and the images.

Figure 8:
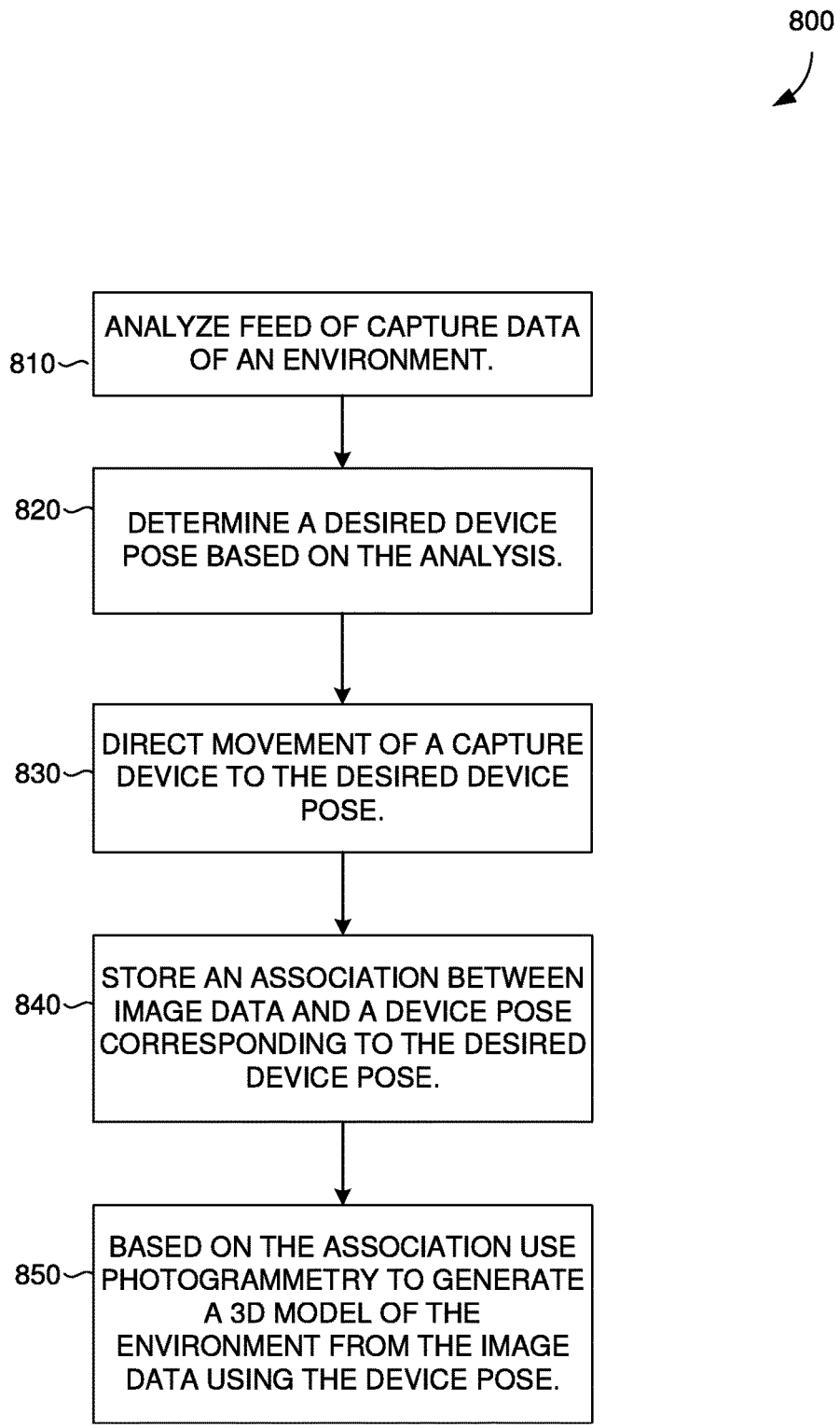
FIG. 8 is a flow diagram showing a method in accordance with embodiments of the present disclosure.

Referring to FIG. 8, FIG. 8 is a flow diagram showing method 800 for generating photogrammetry data. At block 810, method 800 includes analyzing a feed of capture data of an environment. At block 820, method 800 includes determining a desired device pose based on the analysis. At block 830, method 800 includes directing movement of a capture device to the desired device pose. At block 840, method 800 includes storing an association between image data and a device pose corresponding to the desired device pose. At block 850, method 800 includes based on the association, using photogrammetry data to generate a 3D model of the environment from the image data using the device pose.

Figure 9:
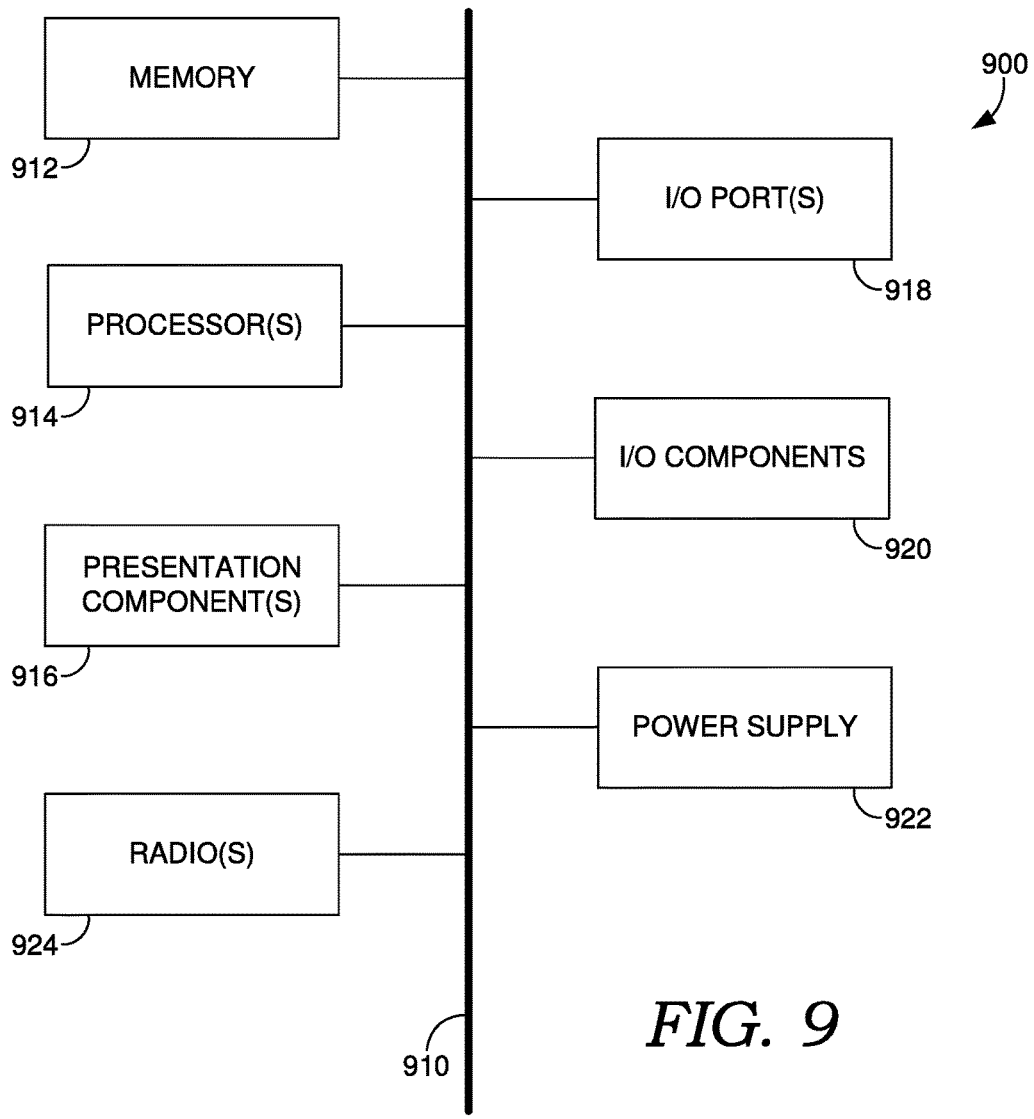
FIG. 9 is a block diagram of an exemplary computing environment suitable for use in implementing embodiments of the present disclosure.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 9 is merely illustrative of an exemplary computing device that can be used in connection with one or more embodiments of the present invention. Distinction is not made between such categories as "workstation," "server," "laptop," "handheld device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 900. Computing device 900 may be equipped with depth cameras, such as stereoscopic camera systems, infrared camera systems, RGB camera systems, and combinations of these, for gesture detection and recognition. Additionally, computing device 900 may be equipped with accelerometers or gyroscopes that enable detection of motion. The output of the accelerometers or gyroscopes may be provided to the display of computing device 900 to render immersive augmented reality or virtual reality.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented system comprising:
    one or more processors; and
    one or more computer-readable media having executable instructions embodied thereon, which, when executed by the one or more processors, cause the one or more processors to perform a method comprising:
    capturing, using a capture device, a sequence of images of a physical environment while tracking device poses of the capture device as the capture device moves around the physical environment;
    for each image of a plurality of images in the sequence of images, storing a corresponding device pose of the device poses as metadata of the image;
    determining a desired device pose for the capture device based on an analysis of one or more images in the sequence of images;
    directing movement of the capture device to the desired device pose for capturing an additional image using a user feedback loop generated from the device poses, wherein storing the corresponding device pose for the additional image is based on determining that the corresponding device pose corresponds to the desired device pose; and
    generating, by photogrammetry, a three-dimensional (3D) model of the physical environment from the plurality of images, the photogrammetry using for each image in the plurality of images, the corresponding device pose from the metadata of the image to generate the 3D model.

2. The computer-implemented system of claim 1, wherein the generating of the 3D model comprises:
    determining common points between images based on the corresponding device pose of images of the plurality of images; and
    estimating 3D coordinates of an object in the physical environment based on the determined common points.

3. The computer-implemented system of claim 1, wherein the method further comprises for the plurality of images, storing corresponding camera properties of the capture device as metadata of the image, wherein the photogrammetry further uses for each image in the plurality of images, the corresponding camera properties from the metadata of the image to generate the 3D model.

4. The computer-implemented system of claim 1, wherein the method comprises during the capturing of the sequence of images:
    assigning a score to an image in the sequence of images based on an analysis of the image;
    refraining from including the image in the plurality of images based on the score;
    adjusting camera properties of the capture device based on the score;
    assigning an additional score to an additional image in the sequence of images based on an analysis of the image, the additional image captured using the adjusted camera properties; and
    based on the additional score including the additional image in the plurality of images.

5. The computer-implemented system of claim 1, wherein the method further comprises:
    wherein directing movement of the capture device to the desired device pose using the user feedback loop comprises intensifying device feedback in the user feedback loop as the capture device approaches the desired device pose and fading the device feedback as the capture device moves further from the desired device pose.

6. The computer-implemented system of claim 1, wherein the capturing of the sequence of images is from a live video feed.

7. The computer-implemented system of claim 1, wherein each of the device poses comprises a respective orientation of the capture device in space.

8. A computer-implemented method comprising:
    analyzing a feed of capture data of a physical environment from a capture device as the capture device moves around a physical environment;
    determining a desired device pose for the capture device based on the analyzing of the capture data;
    directing movement of the capture device to the desired device pose using a user feedback loop generated from the feed of capture data, wherein directing the movement of the capture device to the desired device pose comprises intensifying device feedback in the user feedback loop as the capture device approaches the desired device pose and fading the device feedback as the capture device moves further from the desired device pose;
    based on determining a device pose of the capture device corresponds to the desired device pose, storing an association between image data captured by the capture device and the device pose; and
    generating, by photogrammetry, a three-dimensional (3D) model of the physical environment from the image data, the photogrammetry using the device pose with the image data to generate the 3D model based on the stored association.

9. The computer-implemented method of claim 8, wherein the generating of the 3D model comprises:
    determining common points between images based on the device pose and the image data; and
    estimating 3D coordinates of an object in the physical environment based on the determined common points.

10. The computer-implemented method of claim 8, wherein the feed of capture data comprises a live video feed.

11. The computer-implemented method of claim 8, wherein the device pose comprises an orientation of the capture device in space.

12. The computer-implemented method of claim 8, wherein the association is further between camera properties corresponding to the image data and the image data, and the photogrammetry further users the camera properties with the image data to generate the 3D model based on the stored association.

13. The computer-implemented method of claim 8, further comprising repeatedly capturing images corresponding to the desired device pose and adjusting camera properties of the capture device until an analysis of the images indicates at least one image of the images is sufficient for the photogrammetry, wherein the image data corresponds to the image.

14. The computer-implemented method of claim 8, wherein the desired device pose comprises a respective orientation of the capture device in space device feedback.

15. The computer-implemented method of claim 8, wherein the desired device pose is based on determining coverage of the physical environment by photogrammetry data.

16. One or more computer storage media having executable instructions embodied thereon, which, when executed by one or more processors, cause the one or more processors to perform a method comprising:

capturing, using a capture device, a sequence of images of a physical environment while tracking device poses of the capture device as the capture device moves around the physical environment;

for each image of a plurality of images in the sequence of images, storing a corresponding device pose of the device poses as metadata of the image;

directing movement of the capture device to a desired device pose using a user feedback loop for capturing an additional image, based on an analysis of one or more images in the sequence of images;

based on determining that a device pose of the capture device corresponds to the desired device pose, storing an association between image data for the additional image captured by the capture device and the device pose; and generating, by photogrammetry, a three-dimensional (3D) model of the physical environment from the plurality of images, the photogrammetry using for each image in the plurality of images, the device pose from the metadata of the image to generate the 3D model.

17. The one or more computer storage media of claim 16, wherein the generating of the 3D model comprises:

determining common points between images based on the corresponding device pose of images of the plurality of images; and estimating 3D coordinates of an object in the physical environment based on the determined common points.

18. The one or more computer storage media of claim 16, wherein the capturing of the sequence of images is from a live video feed.

19. The one or more computer storage media of claim 16, wherein each of the device poses comprises a respective orientation of the capture device in space.

20. The one or more computer storage media of claim 16, further comprising for the plurality of images, storing corresponding camera properties of the capture device as metadata of the image, wherein the photogrammetry further uses for each image in the plurality of images, the corresponding camera properties from the metadata of the image to generate the 3D model.

* * * * *